July 3, 1962
M. KOULIKOVITCH
3,042,804
HIGH PRECISION READING DEVICE
Filed March 21, 1960
3 Sheets-Sheet 1
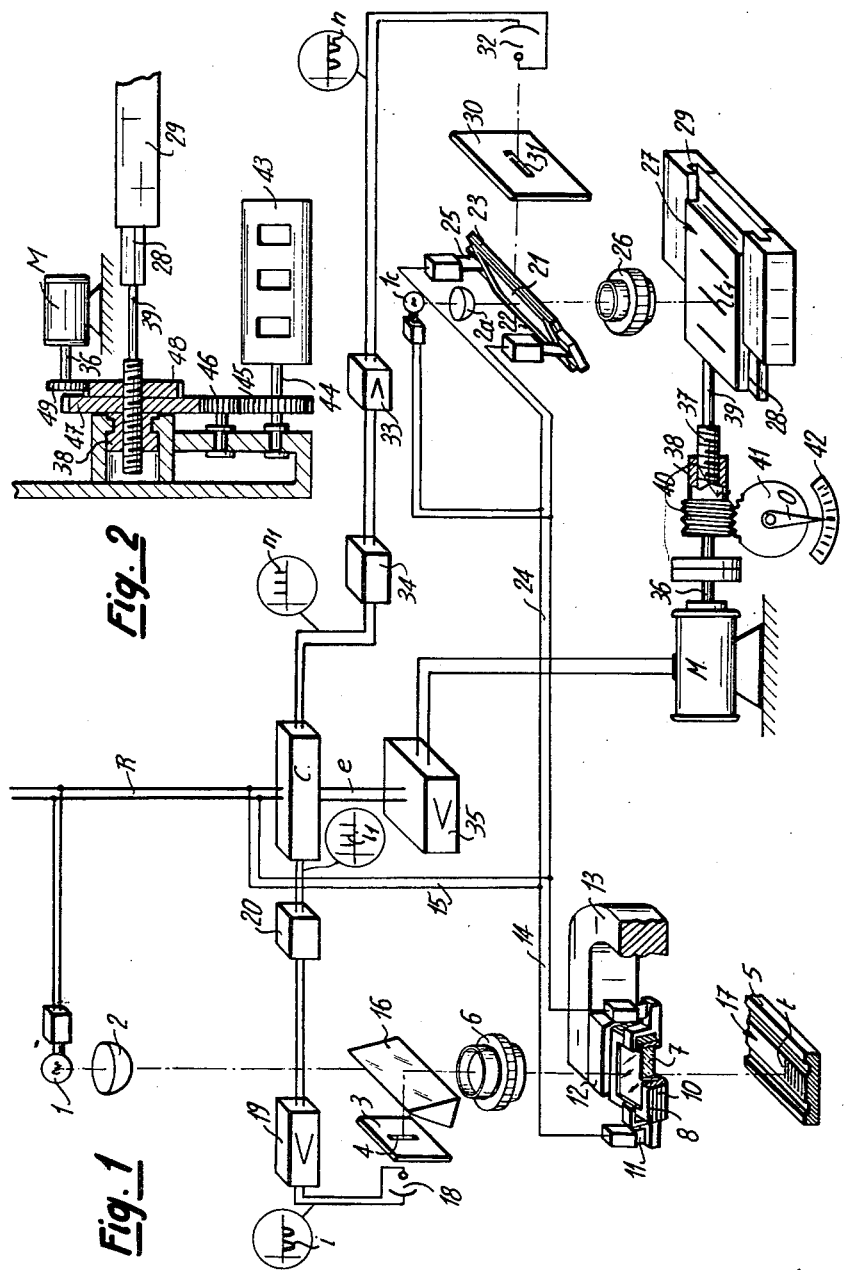
INVENTOR
MIRON KOULIKOVITCH
By Irwin S. Thompson
ATTY.

July 3, 1962   M. KOULIKOVITCH   3,042,804
HIGH PRECISION READING DEVICE
Filed March 21, 1960   3 Sheets-Sheet 2

INVENTOR
MIRON KOULIKOVITCH
By Irwin S. Thompson
ATTY.

July 3, 1962 M. KOULIKOVITCH 3,042,804
HIGH PRECISION READING DEVICE
Filed March 21, 1960 3 Sheets-Sheet 3
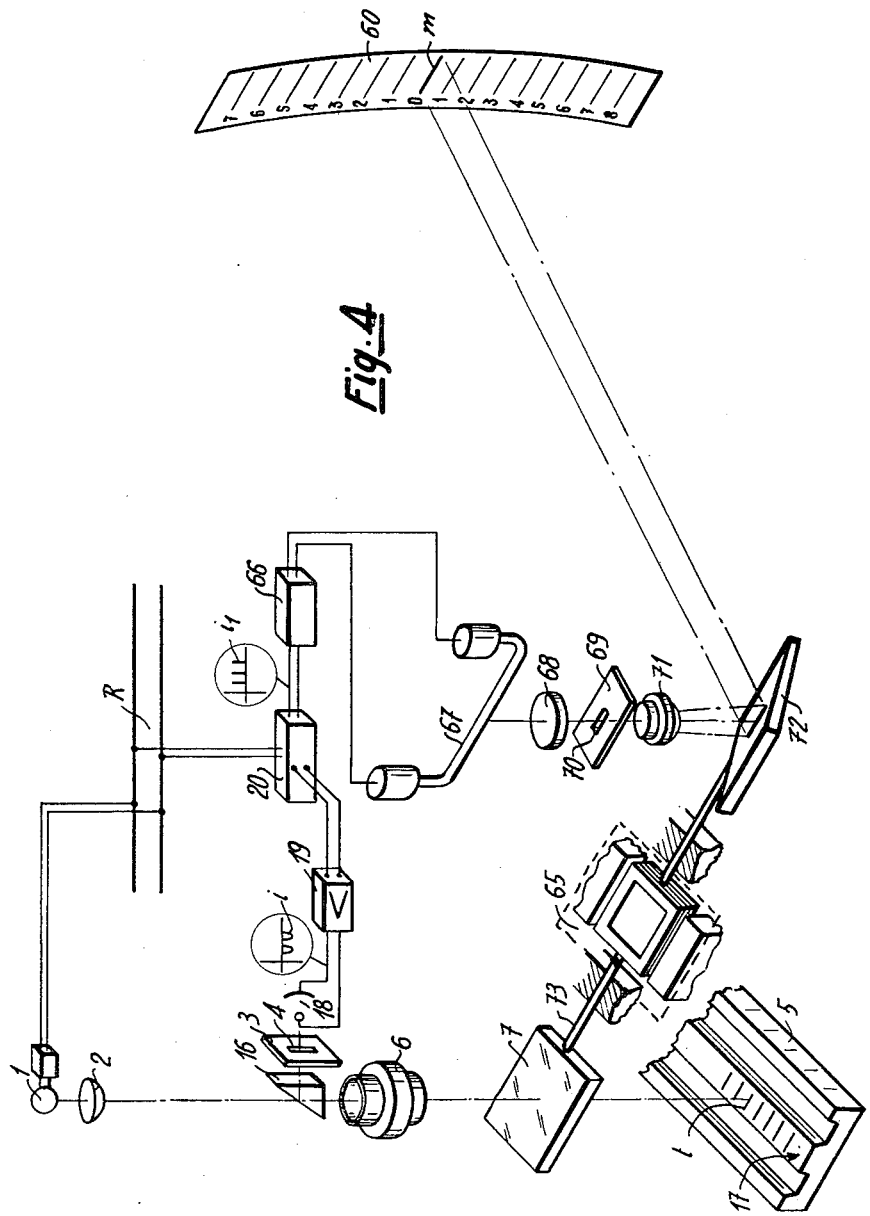
INVENTOR
MIRON KOULIKOVITCH
By Irwin S. Thompson
ATTY.

United States Patent Office 3,042,804
Patented July 3, 1962

3,042,804
HIGH PRECISION READING DEVICE
Miron Koulikovitch, Geneva, Switzerland, assignor to Societe Genevoise d'Instruments de Physique, Geneva, Switzerland, a corporation of Switzerland
Filed Mar. 21, 1960, Ser. No. 16,319
Claims priority, application Switzerland Apr. 10, 1959
7 Claims. (Cl. 250—206)

The present invention has for its object a high precision reading device of the graduation of a precision scale comprising a photoelectric microscope having an optical sighting unit, a deflector making an optical axis oscillate periodically to and fro about a fixed median position, as also a photoelectric cell collecting the rays reflected by the surface of the precision scale.

Such precision reading devices are known, and described, for example, in the British Patent No. 686,274, and prove satisfactory only as far as the amplitude of the oscillation of the deflector is large enough, with respect to the size order of the errors to be measured, so that the utilized portion of the sweeping sinusoid may be assimilated to a straight line. Effectively, it is only when said requirement is met that a satisfactory proportionality can be obtained.

On the contrary, when the error to be measured is relatively large with respect to the sweeping amplitude, the displacement of the indicating member is no more in linear proportion to the position error between the sighting axis and the sighted mark, which presents drawbacks in certain cases.

The high precision reading device, subject of the invention, tends to overcome said drawback by the fact that it comprises an analogical reading device expressing in linear way the position error between the optical axis of the sighting device and a graduation mark.

The accompanying drawings illustrate schematically and by way of example three embodiments of the reading device.

FIG. 1 is an optical and electrical diagram of a first embodiment which comprises a comparison scale.

FIG. 2 shows partially in section a variation of the indicator.

FIG. 4 shows the optical and electrical diagram of a third embodiment.

Figure 3:
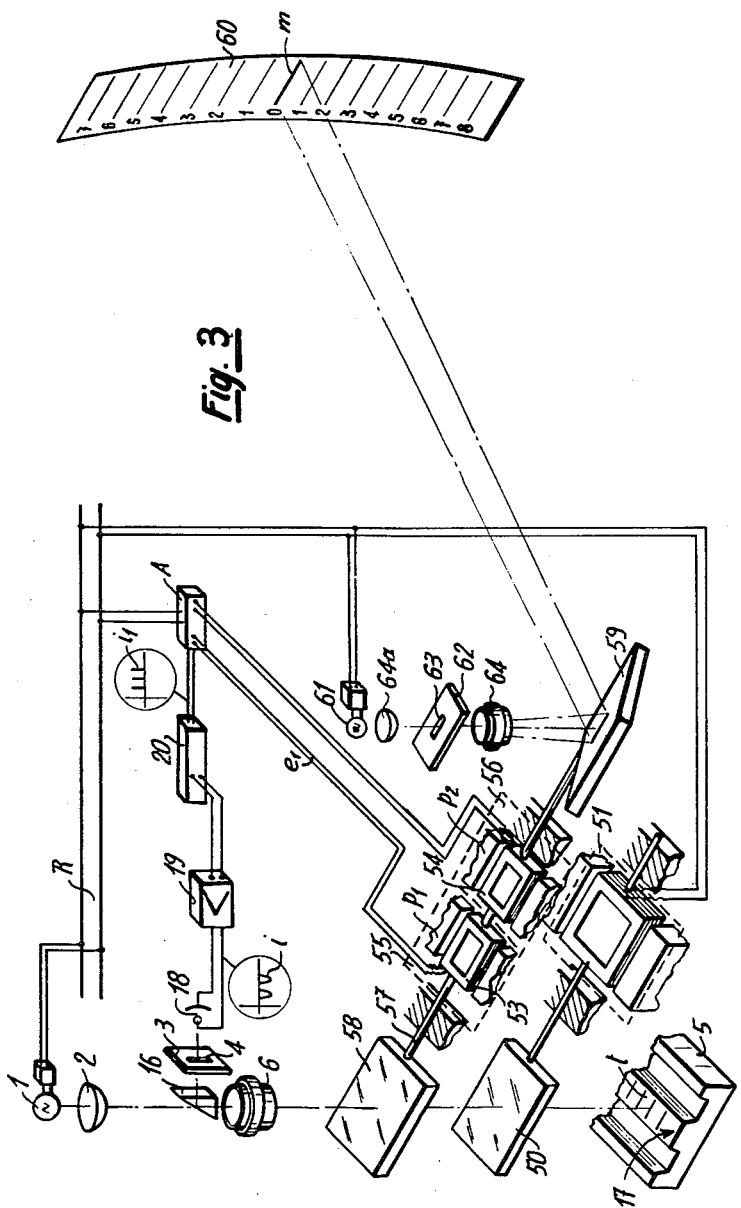
FIG. 3 shows the optical and electrical diagram of a second embodiment comprising a centering device of the median position of the image of the mark of the scale on the optical sighting axis.

According to FIG. 1, the sighting device comprises an optical sighting device which comprises a source of light 1 and a condenser lens 2. Said device emits a light beam which is projected onto a precision graduated scale 5 through an objective lens 6. Between said latter and the precision scale 5 is disposed a sweeping device imparting to the reflected image of a graduation mark a periodical to and fro movement. Said sweeping device comprises a deflector constituted by a plano-parallel glass plate 7 carried by a frame 8 provided with a coil 10 and elastically suspended through spring blades 11 between the pole-shoes 12 (of which one only is shown) of a permanent magnet 13. The coil 10 is connected through wires 14, 15 with alternating current supplying mains R.

In front of the objective lens 6 is disposed a prism 16 which deflects part of the rays reflected by the surface 17 of the precision scale onto a screen 3 provided with a slot 4 and behind which is disposed a photoelectric cell 18 connected with an electronic amplifier 19 which feeds an electronic apparatus 20 transforming the impulses $i$ emitted by the photoelectric cell into impulses $i_1$ of very short duration, which are applied to an electronic comparator C.

The coil 10 being fed with alternating current, the deflector 7 is driven into an even oscillatory movement, so that the image of the graduation projected by the object-glass 6 and deflected by the prism 16 sweeps to and fro over the screen 3 about a median plane in which is located the slot 4. In consequence, every time that the image of a graduation mark $t$ crosses the slot 4 of the screen 3, the intensity of the light flux collected by the cell 18 undergoes a variation which causes a modification of the current going through said cell and the emission of an impulse $i$. After amplification said impulse is transformed into an instantaneous impulse $i_1$. If a graduation mark $t$ is located on the optical axis of the sighting device, and that in consequence its image is located in the median plane of the sweeping movement imparted to the beam of rays by the deflector 7, the impulses $i$ are produced at even intervals of time. On the contrary, for every other position of the graduation mark $t$, the current impulses $i$ follow each other at uneven intervals of time, the difference of the times between three successive impulses being a function of the position error between the image of the mark $t$ and the median plane of the sweeping movement of the beam of rays.

In order to eliminate the errors of proportionality between said difference of the time intervals and the value of said position error when said error is relatively large with respect to the sweeping amplitude, the device represented comprises a semi-transparent mirror 21 the oscillatory movement of which is exactly synchronized with that of the deflector 7. To this effect, said mirror is carried by a frame 22 provided with a coil 23 connected through wires 24 and wires 15 with the mains R. Said frame is elastically suspended by means of spring blades 25 between the pole-shoes of a permanent magnet, not shown, similar in every point to the permanent magnet 13.

Said mirror 21 is located on the optical axis of a lighting device comprising a source of light $1_a$, a condenser lens $2_a$ and an objective lens 26 which projects the image of a mark $t_1$, drawn in the surface 27 of a slide 28 engaged in a guideway 29. The image of the mark $t_1$ projected by the objective lens 26 is reflected by the semi-transparent miror 21 onto an opaque screen 30 provided with a slot 31 located opposite a photoelectric cell 32. Every time that the image of the mark $t_1$ coincides with the slot 31 during the oscillatory movement of the semi-transparent mirror 21, the lighting of the photoelectric cell 32 undergoes a variation which causes the emission of an impulse $n$. The cell 32 is connected with an electronic amplifier 33 which feeds an electronic apparatus 34 transforming the impulses $n$ into impulses of very short duration $n_1$ which are applied to the electronic comparator C.

Said comparator delivers an error voltage $e$, which, after amplification by an electronic amplifier 35, feeds a motor M connected, on the one hand, to a slide 28 through a nut 38, driven by its shaft 36, and a screw 37 fast with a rod 39 secured to said slide, and, on the other hand, to an indicating member O through a worm 40, fast with the nut 38, and a helical gear 41 carrying said indicating member which travels opposite a scale 42.

The value of the error voltage $e$ produced by the comparator C is a function of the phase difference between the impulses $i_1$ and $n_1$ which are applied to it, said voltage $e$ coming down to zero when said impulses $i_1$ and $n_1$ present a phase coincidence. Now, one sees that the error of proportionality between the time intervals of the successive impulses $i_1$, when the position error of the mark $t$ with respect to the sighting optical axis is large with respect to the amplitude of the sweeping imparted by the deflector 7, becomes automatically compensated by an error of proportionality exactly similar between the time intervals of the successive impulses $n_1$. The error voltage $e$ comes down to zero when the mark $t_1$ occupies, with respect to the optical axis of the objective lens 26, a position for which the cell 32 produces impulses whose differences between the time intervals are equal to the time differences of the impulses produced by the cell 18 and generated by the shift of the mark $t$ with respect to the optical axis of the objective lens 6. Thus, the indicating member O reproduces exactly, but amplified and with a great accuracy, the error of the position of the graduation mark $t$ of the scale 5 with respect to the optical axis of the sighting device. Furthermore, the position error of said indicating member O with respect to a zero position is in linear way proportional to said position error of the graduation mark $t$.

It is easy to realize that said reading device has a first magnification corresponding to the ratio of the amplitudes of the two sweeping movements and which can easily be of the size order of 10,000 and a second magnification corresponding to the ratio between the displacements of the slide 28 and the displacement of the indicating member O along the scale 42 and which can easily be of the size order of 1,000, so that the total enlarging or magnification can easily be of the order of $10^6$. In consideration of said considerable amplification, it is clear that the small errors of mechanical transmission remain without influence on the reading precision; said transmission errors may further be reduced to a minimum by a precision machining of the nut 38, of the screw 37, of the worm 40 and of the helical gear 41. In consequence, the analogical reading device described expresses in linear way the position error between the optical axis of the sighting device and a graduation mark $t$.

In the embodiment shown in FIG. 2, the indicating member is constituted by a counter 43 of known type, the driving shaft 44 of which is connected through a gear train 45, 46, 47 to the nut 38 which is connected through toothed wheels 48 and 49 to the shaft 36 of the motor M. Here too, the indications of the counter 43, which are directly proportional to the amplitude of the angular displacement of the shaft 44, express in linear way the position error of the graduation mark $t$ with respect to the optical axis of the sighting device.

In the embodiment shown in FIG. 3, the reading device comprises an optical sighting device similar to that of the first embodiment and the members and elements of which, already described with reference to FIG. 1, carry the same reference numerals.

A deflector 50, driven into an even oscillatory movement by an electro dynamic motor 51 fed with alternating current, imparts an even sweeping movement to the image reflected by the surface 17 of the scale 5.

As in the first embodiment described, part of the rays reflected by the surface 17 of the precision scale 5 are deflected by the prism 16 onto the screen 3, the slot 4 of which is located opposite the photoelectric cell 18. Said cell produces then impulses $i$ every time that the image of the mark $t$ of said scale crosses the slot 4. After amplification in the amplifier 19, said impulses $i$ are transformed, through the electronic apparatus 20, into impulses $i_1$ of very short duration. Said impulses are applied to an electronic apparatus A of known type, delivering an error voltage $e_1$ proportional to the differences of the time intervals between the successive impulses $i_1$. Thus, when the mark $t$ is located on the optical axis of the sighting device, the time intervals being equal, the voltage $e_1$ is zero. If the mark $t$ is shifted towards the left side of the drawing, the voltage $e_1$ increases in the positive direction for example. On the other hand, if the mark $t$ is shifted towards the right side of the drawing, the voltage $e_1$ increases in the negative direction.

Said direct current voltage $e_1$ is applied to the rotor 53 of an electrodynamic motor 55. Said rotor 53, disposed between the polar-shoes of a permanent magnet $p_1$, is fixed on a shaft 57 one of the ends of which carries an auxiliary deflector 58 located between the objective lens 6 and the deflector 50, while its other end carries a mirror 59. Said mirror reflects onto a scale 60 a luminous beam produced by a device comprising a source of light 61, a condenser lens 64a, a screen 62 provided with a slot 63 and an objecting lens 64. When the voltage $e_1$ is zero, i.e. when the sighted mark lies on the optical axis, the auxiliary deflector 58 is maintained by the rotor 53 in a plane perpendicular to the optical axis of the sighting device. Consequently, the auxiliary deflector 58 does not cause any deviation of the optical axis of the sighting device and the mirror 59 reflects the beam of rays projected by the objective lens 64 onto the zero of the scale 60.

On the other hand, as soon as the mark $t$ presents a position error with respect to said sighting optical axis, the time intervals between the successive impulses $i$ being unequal, the voltage $e_1$ increases in absolute value and in the direction corresponding to said position error, so that the deflector 58 is angularly displaced in order to restore the equality of the time intervals between the successive impulses $i$. Said deflector takes then a new position of equilibrium for which the voltage $e_1$ is zero. It is clear that the angular displacement of the auxiliary deflector 58, necessary to restore the equality of said time intervals, is larger than the position error of the mark $t$ is greater.

It follows that the angular displacement of the mirror 59, which is made fast with the deflector 58, is strictly proportional to said position error and that the luminous mark $m$, formed onto the scale 60 by the beam of rays projected by the objective lens 64, occupies at every moment, with respect to the zero of said scale, a position which is exactly analogous to the position of the graduation mark $t$ with respect to the optical axis of the sighting device. Here still, the analogical reading device expresses thus in linear way the position error of the graduation mark $t$ with a magnification practically as large as desired.

The deflector 58 is further equipped with a stabilization device 56 constituted by a frame 54 provided with a coil and rotating between the poles of a permanent magnet $p_2$. The voltage induced into the coil carried by the frame 54, upon a rotation of the shaft 57, is applied to the apparatus A. Said voltage, which is proportional to the rotation speed of the shaft 57, is combined by the apparatus A with the voltage $e_1$ in order to obtain a stabilization effect. Said stabilization device 56 has then an effect similar to that of a tachometer dynamo.

In the embodiment shown in FIG. 4, the reading device comprises a sighting device similar to that described with reference to FIG. 1. However, the deflector 7 is carried by a shaft 73 of an electrodynamic motor 65 fed with alternating current. Said deflector is thus driven into an even oscillatory movement and imparts to the reflected image of the graduation $t$ an even sweeping movement.

The current impulses $i$ produced by the photoelectric cell 18, after amplification in the amplifier 19, are transformed by the apparatus 20 into impulses of very short duration $i_1$ which control an electronic relay 66 adapted for instantaneous action. Said relay controls in its turn the feeding of a flashing lamp 67, so that said lamp produces a flash of light every time that the image of a graduation mark $t$ of the precision scale 5 crosses the slot 4 of the screen 3.

An optical device comprising a condenser lens 68 and a screen 69 provided with a slot 70 forms a light beam which is projected through an objective lens 71 onto a mirror 72 carried by the shaft 73 of the electrodynamic motor 65.

From the examination of the accompanying drawing, one notices immediately that, due to the fact that the mirror 72 is rigidly connected to the deflector 7, every flash of the lamp 67 is produced at precisely the moment where the mark $t$ crosses the slot 4. The luminous mark $m$ occupies at said moment precisely a position exactly analogous to that of the mark *t*. The errors, due to the sinusoidal shape of the sweeping movement imparted to the image of the mark *t* projected onto the screen 4, are exactly compensated, so that the luminous mark *m*, formed on the scale 60 by the beam of rays reflected by said mirror 72, occupies, with respect to the zero of said scale, a position analogous in linear way to the position of the mark *t* with respect to the optical axis of the sighting device.

I claim:

1. In a high precision reading device of the graduation marks of a precision scale comprising a photoelectric microscope having an optical sighting unit, a deflector for making an optical axis oscillate periodically to and fro about a fixed median position and a photoelectric cell collecting the rays reflected by the surface of a precision scale and comprising further an analogical reading device expressing in linear way the position error between said optical axis of said optical sighting unit and one graduation mark of said precision scale, said analogical reading device comprising a projecting device having an oscillating mirror the oscillatory movement of which is synchronized with the oscillatory movement of said deflector, the combination of a second photoelectric cell, a screen, a slot in said screen, said second photoelectric cell being located behind said screen, a slide, and a second scale carried by said slide, said second scale presenting further graduation marks, said oscillating mirror reflecting onto said photoelectric cell the image of one of said further marks of said second scale.

2. A device as claimed in claim 1 and comprising further a phase comparator receiving the impulses produced by both of said photoelectric cells and delivering an error voltage which falls down to zero when said impulses present a phase coincidence.

3. In a high precision reading device of the graduation marks of a precision scale comprising a photoelectric microscope having an optical sighting unit, a deflector for making an optical axis oscillate periodically and a photoelectric cell collecting the rays reflected by the surface of a precision scale and comprising further an analogical reading device expressing in linear way the position error between said optical axis and one graduation mark of said precision scale, said analogical reading device having a mirror driven in an oscillating movement synchronized with the one of said deflector, the combination of a second photoelectric cell, a screen, a slot in said screen, said second photoelectric cell being located behind said screen, a slide comprising a second scale presenting further graduation marks, said second photoelectric cell collecting the image of one of said further marks reflected by said oscillating mirror, a motor which controls the displacement of said slide, a phase comparator receiving the impulses produced by both of said photoelectric cells and delivering an error voltage which falls down to zero when the phase of said impulses coincides, said error voltage feeding said motor.

4. In a high precision reading device of the graduation marks of a precision scale comprising a photoelectric microscope having an optical sighting unit, a deflector for making an optical axis oscillate periodically to and fro about a fixed median position and a photoelectric cell collecting the rays reflected by the surface of a precision scale and comprising further an analogical reading device expressing in linear way the position error between said optical axis of said optical sighting unit and one graduation mark of said precision scale, said analogical reading device comprising a projecting device having an oscillating mirror the oscillatory movement of which is synchronized with the oscillatory movement of said deflector, the combination of a second photoelectric cell, a screen, a slot in said screen, said second photoelectric cell being located behind said screen, a slide, a second scale carried by said slide, said second scale presenting further graduation marks, said oscillating mirror reflecting onto said second photoelectric cell the image of one of said further marks of said second scale, the further combination of a phase comparator receiving the impulses produced by both said photoelectric cells and delivering an error voltage which falls down to zero when said impulses present a phase coincidence, a motor fed by said error voltage and which controls the displacements of said slide, and of an indicating member and a mechanical multiplier, the shaft of said motor controlling the displacements of said slide being connected through said mechanical multiplier to said indicating member.

5. In a high precision reading device of the graduation marks of a precision scale comprising a photoelectric microscope having an optical sighting unit, a deflector for making an optical axis oscillate periodically to and fro about a fixed median position and a photoelectric cell collecting the rays reflected by the surface of a precision scale and comprising further an analogical reading device expressing in linear way the position error between said optical axis of said optical sighting unit and one graduation mark of said precision scale, said analogical reading device comprising a compensating device compensating the errors due to the sinusoidal shape of the sweeping movement imparted by said deflector, the combination of an auxiliary deflector located on the optical axis of said optical sighting unit, an electrodynamic motor controlling the angular displacements of said auxiliary deflector, said electrodynamic motor being fed by a voltage the value of which is a function of the difference between the time intervals of the successive impulses produced by said photoelectric cell of said optical sighting unit.

6. In a high precision reading device of the graduation marks of a precision scale comprising a photoelectric microscope having an optical sighting unit, a deflector for making an optical axis oscillate periodically to and fro about a fixed median position and a photoelectric cell collecting the rays reflected by the surface of a precision scale and comprising further an analogical reading device expressing in linear way the position error between said optical axis of said optical sighting unit and one graduation mark of said precision scale, said analogical reading device comprising a compensating device compensating the errors due to the sinusoidal shape of the sweeping movement imparted by said deflector, the combination of an auxiliary deflector located on the optical axis of said optical sighting unit, an electrodynamic motor controlling the angular displacements of said auxiliary deflector, said electrodynamic motor being fed by the voltage the value of which is a function of the difference between the time intervals of the successive impulses produced by said photoelectric cell of said optical sighting unit, and of a projection device comprising a mirror carried by the shaft of said electrodynamic motor, and a fixed scale, said mirror projecting onto said scale a luminous mark the position of which is a function of the angular position of said auxiliary deflector.

7. In a high precision reading device of the graduation marks of a precision scale comprising a photoelectric microscope having an optical sighting unit, a deflector for making an optical axis oscillate periodically to and fro about a fixed median position and a photoelectric cell collecting the rays reflected by the surface of a precision scale and comprising further an analogical reading device expressing in linear way the position error between said optical axis of said optical sighting unit and one graduation mark of said precision scale, said analogical reading device comprising a compensating device compensating the errors due to the sinusoidal shape of the sweeping movement imparted by said deflector, the combination of an auxiliary deflector located on the optical axis of said optical sighting unit, an electrodynamic motor controlling the angular displacements of said auxiliary deflector, said electrodynamic motor being fed by a voltage the value of which is a function of the difference between the time intervals of the successive impulses produced by said photoelectric cell of said optical sighting unit, and of a stabilization device which comprises a coil placed in a magnetic field and the induced voltage of which is proportional to the speed of the angular displacement of said auxiliary deflector and is combined with said voltage proportional to the difference between the time intervals of the said successive impulses.

References Cited in the file of this patent

UNITED STATES PATENTS

| | | |
|---|---|---|
| 1,859,020 | Brown | May 17, 1932 |
| 2,401,712 | Turrettini | June 4, 1946 |
| 2,602,326 | Russenberger | July 8, 1952 |